United States Patent
Garudadri et al.

(10) Patent No.: US 9,717,018 B2
(45) Date of Patent: Jul. 25, 2017

(54) SYNCHRONIZATION OF AUDIO AND VIDEO DATA IN A WIRELESS COMMUNICATION SYSTEM

(75) Inventors: Harinath Garudadri, San Diego, CA (US); Phoom Sagetong, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 891 days.

(21) Appl. No.: 11/129,635

(22) Filed: May 13, 2005

(65) Prior Publication Data
US 2005/0259694 A1    Nov. 24, 2005

Related U.S. Application Data

(60) Provisional application No. 60/571,673, filed on May 13, 2004.

(51) Int. Cl.
*H04L 12/66* (2006.01)
*H04W 28/06* (2009.01)
(Continued)

(52) U.S. Cl.
CPC ............. *H04W 28/06* (2013.01); *H04L 29/06* (2013.01); *H04L 29/06027* (2013.01);
(Continued)

(58) Field of Classification Search
CPC ....... H04L 29/06; H04L 47/36; H04L 65/604; H04L 65/80; H04L 69/04; H04L 69/166;
(Continued)

(56) References Cited

U.S. PATENT DOCUMENTS

| 4,948,019 A | 8/1990 | Rodum |
| 5,510,842 A | 4/1996 | Phillips et al. |

(Continued)

FOREIGN PATENT DOCUMENTS

| CN | 1316163 A | 10/2001 |
| EP | 0424903 | 5/1991 |

(Continued)

OTHER PUBLICATIONS

International Preliminary Report on Patentability—PCT/US05/016839—International Preliminary Examining Authority—United States Office—Sep. 28, 2006.
(Continued)

*Primary Examiner* — Luat Phung
(74) *Attorney, Agent, or Firm* — Howard Seo

(57) ABSTRACT

Techniques are described for encoding an audio video stream that is transmitted over a network, for example a wireless or IP network, such that an entire frame of audio and an entire frame of video are transmitted simultaneously within a period required to render the audio video stream frames by an application in a receiver. Aspects of the techniques include receiving audio and video RTP streams and assigning an entire frame of RTP video data to communication channel packets that occupy the same period, or less, as the video frame rate. Also an entire frame of RTP audio data is assigned to communication channel packets that occupy the same period, or less, as the audio frame rate. The video and audio communication channel packets are transmitted simultaneously. Receiving and assigning RTP streams can be performed in a remote station, or a base station.

27 Claims, 9 Drawing Sheets

(51) Int. Cl.

| | |
|---|---|
| H04L 29/06 | (2006.01) |
| H04L 12/805 | (2013.01) |
| H04N 21/2381 | (2011.01) |
| H04N 21/414 | (2011.01) |
| H04N 21/61 | (2011.01) |
| H04N 21/6437 | (2011.01) |
| H04N 21/647 | (2011.01) |
| H04W 88/18 | (2009.01) |
| H04N 19/102 | (2014.01) |
| H04N 19/115 | (2014.01) |
| H04N 19/61 | (2014.01) |
| H04N 19/124 | (2014.01) |
| H04N 19/152 | (2014.01) |
| H04N 19/164 | (2014.01) |
| H04N 19/174 | (2014.01) |
| H04W 4/06 | (2009.01) |
| H04W 72/04 | (2009.01) |
| H04W 88/02 | (2009.01) |
| H04N 21/44 | (2011.01) |
| H04N 21/4788 | (2011.01) |
| H04W 72/12 | (2009.01) |
| H04W 80/00 | (2009.01) |
| H04W 84/04 | (2009.01) |

(52) U.S. Cl.
CPC ............ *H04L 47/36* (2013.01); *H04L 65/601* (2013.01); *H04L 65/604* (2013.01); *H04L 65/80* (2013.01); *H04L 69/04* (2013.01); *H04L 69/161* (2013.01); *H04L 69/166* (2013.01); *H04N 19/102* (2014.11); *H04N 19/115* (2014.11); *H04N 19/124* (2014.11); *H04N 19/152* (2014.11); *H04N 19/164* (2014.11); *H04N 19/174* (2014.11); *H04N 19/61* (2014.11); *H04N 21/2381* (2013.01); *H04N 21/41407* (2013.01); *H04N 21/6131* (2013.01); *H04N 21/6181* (2013.01); *H04N 21/6437* (2013.01); *H04N 21/64707* (2013.01); *H04W 4/06* (2013.01); *H04W 28/065* (2013.01); *H04W 72/044* (2013.01); *H04W 88/02* (2013.01); *H04W 88/181* (2013.01); *H04L 69/22* (2013.01); *H04N 21/44004* (2013.01); *H04N 21/4788* (2013.01); *H04W 72/1263* (2013.01); *H04W 80/00* (2013.01); *H04W 84/04* (2013.01)

(58) Field of Classification Search
CPC ................ H04L 69/161; H04L 65/601; H04L 29/06027; H04L 69/22; H04W 88/02; H04W 28/06; H04W 28/065; H04W 88/181; H04W 4/06; H04W 72/044; H04W 72/1263; H04W 80/00; H04W 84/04; H04N 21/2381; H04N 21/41407; H04N 21/6131; H04N 21/6181; H04N 21/6437; H04N 21/64707; H04N 19/102; H04N 19/115; H04N 19/61; H04N 19/124; H04N 19/152; H04N 19/164; H04N 19/174; H04N 21/44004; H04N 21/4788
USPC ....... 370/503, 506, 230, 412, 468, 476, 509; 709/247; 725/67, 68, 81; 379/67.1; 382/245
See application file for complete search history.

(56) References Cited

U.S. PATENT DOCUMENTS

| | | | |
|---|---|---|---|
| 5,537,409 A | 7/1996 | Moriyama et al. | |
| 5,541,852 A | 7/1996 | Eyuboglu et al. | |
| 5,557,332 A | 9/1996 | Koyanagi et al. | |
| 5,559,608 A | 9/1996 | Kunihiro | |
| 5,570,372 A | 10/1996 | Shaffer | |
| 5,572,705 A | 11/1996 | Carson | |
| 5,583,652 A * | 12/1996 | Ware | 386/206 |
| 5,646,693 A | 7/1997 | Cismas | |
| 5,717,464 A | 2/1998 | Perkins et al. | |
| 5,729,534 A | 3/1998 | Jokinen et al. | |
| 5,844,600 A * | 12/1998 | Kerr | 348/14.12 |
| 5,867,230 A | 2/1999 | Wang et al. | |
| 5,898,695 A * | 4/1999 | Fujii et al. | 370/464 |
| 5,914,717 A | 6/1999 | Kleewein et al. | |
| 6,023,552 A * | 2/2000 | Kunihiro | 386/98 |
| 6,041,067 A * | 3/2000 | Takamori et al. | 370/514 |
| 6,058,141 A * | 5/2000 | Barger et al. | 375/240 |
| 6,085,270 A | 7/2000 | Gulick | |
| 6,108,626 A | 8/2000 | Cellario et al. | |
| 6,111,916 A | 8/2000 | Talluri et al. | |
| 6,154,780 A | 11/2000 | Zhu | |
| 6,181,711 B1 | 1/2001 | Zhang et al. | |
| 6,192,257 B1 | 2/2001 | Ray | |
| 6,215,789 B1 | 4/2001 | Keenan et al. | |
| 6,262,829 B1 | 7/2001 | Kuramoto et al. | |
| 6,473,404 B1 | 10/2002 | Kaplan et al. | |
| 6,473,442 B1 | 10/2002 | Lundjso et al. | |
| 6,496,504 B1 | 12/2002 | Malik | |
| 6,535,043 B2 | 3/2003 | Chen | |
| 6,535,557 B1 | 3/2003 | Saito et al. | |
| 6,536,043 B1 | 3/2003 | Guedalia | |
| 6,542,481 B2 | 4/2003 | Foore et al. | |
| 6,584,125 B1 * | 6/2003 | Katto | 370/537 |
| 6,584,200 B1 | 6/2003 | Tanaka | |
| 6,647,006 B1 | 11/2003 | Rasanen | |
| 6,680,955 B1 | 1/2004 | Le | |
| 6,704,281 B1 * | 3/2004 | Hourunranta et al. | 370/230 |
| 6,891,854 B2 | 5/2005 | Zhang et al. | |
| 6,920,118 B2 | 7/2005 | Lozano | |
| 6,956,875 B2 | 10/2005 | Kapadia et al. | |
| 6,996,069 B2 | 2/2006 | Willenegger | |
| 7,016,337 B1 | 3/2006 | Wu | |
| 7,043,749 B1 * | 5/2006 | Davies | 725/120 |
| 7,068,708 B2 | 6/2006 | LaRosa et al. | |
| 7,149,549 B1 | 12/2006 | Ortiz et al. | |
| 7,230,941 B2 | 6/2007 | Odenwalder et al. | |
| 7,370,094 B2 | 5/2008 | Rousseau et al. | |
| 7,391,717 B2 | 6/2008 | Klemets et al. | |
| 7,453,843 B2 | 11/2008 | Mowery et al. | |
| 7,486,678 B1 | 2/2009 | Devanagondi et al. | |
| 7,530,089 B1 | 5/2009 | Hayes et al. | |
| 7,680,912 B1 | 3/2010 | McNabb et al. | |
| 8,089,948 B2 | 1/2012 | Garudadri et al. | |
| 2001/0008535 A1 * | 7/2001 | Lanigan | 370/487 |
| 2001/0017853 A1 | 8/2001 | Kikuchi et al. | |
| 2002/0009287 A1 | 1/2002 | Ueda | |
| 2002/0048321 A1 | 4/2002 | Katayama | |
| 2002/0049969 A1 * | 4/2002 | Duquesnois et al. | 725/38 |
| 2002/0093982 A1 * | 7/2002 | Joy | H04L 29/06 370/468 |
| 2002/0105976 A1 | 8/2002 | Kelly et al. | |
| 2002/0114388 A1 | 8/2002 | Ueda et al. | |
| 2002/0131426 A1 | 9/2002 | Amit et al. | |
| 2002/0137521 A1 | 9/2002 | Kim et al. | |
| 2002/0150123 A1 * | 10/2002 | Ro | 370/465 |
| 2002/0194606 A1 * | 12/2002 | Tucker et al. | 725/86 |
| 2003/0021298 A1 * | 1/2003 | Murakami et al. | 370/535 |
| 2003/0026342 A1 | 2/2003 | Horiike et al. | |
| 2003/0039465 A1 * | 2/2003 | Bjorgan et al. | 386/20 |
| 2003/0053484 A1 | 3/2003 | Sorenson et al. | |
| 2003/0063628 A1 | 4/2003 | Marko et al. | |
| 2003/0086373 A1 | 5/2003 | Kronz | |
| 2003/0128882 A1 | 7/2003 | Kim et al. | |
| 2003/0140347 A1 | 7/2003 | Varsa | |
| 2003/0147561 A1 * | 8/2003 | Faibish et al. | 382/245 |

(56) References Cited

U.S. PATENT DOCUMENTS

| | | |
|---|---|---|
| 2003/0152107 A1 | 8/2003 | Pekonen |
| 2003/0152224 A1 | 8/2003 | Candelore et al. |
| 2003/0161401 A1 | 8/2003 | Shen et al. |
| 2003/0224806 A1 | 12/2003 | Hebron |
| 2004/0008766 A1 | 1/2004 | Wang et al. |
| 2004/0052209 A1 | 3/2004 | Ortiz |
| 2004/0057446 A1* | 3/2004 | Varsa et al. .................. 370/412 |
| 2004/0066319 A1 | 4/2004 | Chang et al. |
| 2004/0078744 A1 | 4/2004 | Wei et al. |
| 2004/0174912 A1 | 9/2004 | Moon |
| 2004/0196870 A1 | 10/2004 | Cheng et al. |
| 2004/0198371 A1 | 10/2004 | Balasubramanian et al. |
| 2005/0047417 A1* | 3/2005 | Lee et al. .................. 370/395.21 |
| 2005/0094655 A1* | 5/2005 | Newson et al. .............. 370/412 |
| 2005/0105615 A1* | 5/2005 | El-Maleh et al. ....... 375/240.12 |
| 2005/0138251 A1 | 6/2005 | Fanning |
| 2005/0169374 A1 | 8/2005 | Marpe et al. |
| 2005/0172154 A1 | 8/2005 | Short et al. |
| 2005/0220071 A1* | 10/2005 | Sivalingham et al. ....... 370/349 |
| 2005/0226262 A1* | 10/2005 | Hsieh et al. .................. 370/412 |
| 2005/0259613 A1 | 11/2005 | Garudadri et al. |
| 2005/0259623 A1 | 11/2005 | Garudadri et al. |
| 2006/0285654 A1* | 12/2006 | Nesvadba et al. ........... 379/67.1 |
| 2007/0064588 A1 | 3/2007 | Kisoda et al. |
| 2007/0092224 A1* | 4/2007 | Tsukagoshi et al. ........... 386/96 |
| 2008/0002669 A1* | 1/2008 | O'Brien et al. .............. 370/352 |
| 2014/0362740 A1 | 12/2014 | Garudadri et al. |
| 2015/0016427 A1 | 1/2015 | Garudadri et al. |

FOREIGN PATENT DOCUMENTS

| | | |
|---|---|---|
| EP | 1564992 | 8/2005 |
| JP | 2000-196634 | 7/2000 |
| JP | 2004226272 | 8/2004 |
| KR | 1997012585 | 3/1997 |
| KR | 20010024530 | 4/2000 |
| KR | 20010024531 | 4/2000 |
| KR | 20020044169 | 4/2002 |
| KR | 20030088054 | 11/2003 |
| WO | 9528684 | 10/1995 |
| WO | 0021321 | 4/2000 |
| WO | 0078054 | 12/2000 |
| WO | 0152553 | 7/2001 |
| WO | 0152565 | 7/2001 |
| WO | 0205575 | 1/2002 |
| WO | 0215591 | 2/2002 |
| WO | 0223745 | 3/2002 |
| WO | 0223916 | 3/2002 |
| WO | 02065667 | 8/2002 |
| WO | 02089434 | 11/2002 |
| WO | 03041326 A2 | 5/2003 |
| WO | 2004036816 | 4/2004 |

OTHER PUBLICATIONS

International Search Report—PCT/US05/016839, International Search Authority—European Patent Office—Aug. 25, 2005.
Written Opinion—PCT/US05/016839, International Search Authority—European Patent Office—Aug. 25, 2005.
Formulasys, ""The Basics of Wireless"", Dec. 21, 2003, pp. 1-6.
Jonsson: "Zero Byte ROHC RTP", Ericsson Research, Lulea Sweden, Mar. 23, 2001.
Svanbro: "Lower Layer Guidelines for Robust RTP UDP IP Header Compression", IETF Standard, Internet Engineering Task Force, IETF, CH,Networking Working Group, 3409 Ericsson, Dec. 2002, XP015009203.
3GPP TS 45.002, V6.9.0 (Apr. 2005); 3rd Generation Partnership Project; Technical Specification Group GSM/EDGE Radio Access Network; Multiplexing and multiple access on the radio path (Release 6).
Borman, "Robust Header Compression", RFAC 3095, Jul. 2001, pp. 1-157.
Garudadri, et al., "Video Transport over Wireless Networks." 2004, ACM, all pages.
Formulasys, The Basics of Wireless, p. 3-16, 2002.
Kikuchi, et al., "RTP Payload Format for MPEG-4 Audio/Visual Streams," Network Working Group, RFC 3016, Nov. 2000, 20 pp.
Schulzrinne, et al., "RTP: A Transport Protocol for Real-Time Applications," IETF RFC 3550 (Jul. 2003).
Taiwanese Search report—094115718—TIPO—Oct. 4, 2010.
European Search Report—EP10152796—Search Authority—The Hague—Mar. 26, 2010.
European Search Report—EP12195665—Search Authority—The Hague—Apr. 3, 2013.
Pyun, J.Y., et al., "Wireless Measurement Based Resource Allocation for QoS Provisioning over IEEE 802.11 Wireless LAN", IEEE Trans. on Consumer Electronics, Aug. 2003, vol. 49, No. 3, pp. 614-620.
Taiwan Search Report—TW100115872—TIPO—Aug. 9, 2013.
Yallapragada R., et al., "Video Delivery Over Cellular Wireless Networks using EBR Techniques", Personal Wireless Communications, 2005. ICPWC 2005. 2005 IEEE International Conference on New Delhi, India Jan. 23-25, 2005, Piscataway, NJ, USA, IEEE, Jan. 23, 2005 (Jan. 23, 2005), pp. 249-253, XP010798556.

* cited by examiner

SYNCHRONIZATION OF AUDIO AND VIDEO DATA IN A WIRELESS COMMUNICATION SYSTEM

CLAIM OF PRIORITY UNDER 35 U.S.C §119

The present Application for Patent claims priority to U.S. Provisional Application No. 60/571,673, entitled "Multimedia Packets Carried by CDMA Physical Layer Products", filed May 13, 2004, and assigned to the assignee hereof and hereby expressly incorporated by reference herein

REFERENCE TO CO-PENDING APPLICATIONS FOR PATENT

The present Application for Patent is related to the following co-pending U.S. Patent Applications:

U.S. patent application Ser. No. 11/129,625, titled "Delivery Of Information Over A Communication Channel", filed concurrently herewith, assigned to the assignee hereof, and expressly incorporated in its entirety by reference herein.

U.S. patent application Ser. No. 11/129,687, titled "Method And Apparatus For Allocation Of Information To Channels Of A Communication System", filed concurrently herewith, assigned to the assignee hereof, and expressly incorporated in its entirety by reference herein.

U.S. patent application Ser. No. 11/129,735, titled "Header Compression Of Multimedia Data Transmitted Over A Wireless Communication System", filed concurrently herewith, assigned to the assignee hereof, and expressly incorporated in its entirety by reference herein.

BACKGROUND

I. Field

The present invention relates generally to delivery of information over a wireless communication system, and more specifically to synchronization of audio and video data transmitted over a wireless communication system.

II. Background

Various techniques for transmitting multimedia or real-time data, such as audio or video data, over various communication networks have been developed. One such technique is the real-time transport protocol (RTP). RTP provides end-to-end network transport functions suitable for applications transmitting real-time data over multicast or unicast network services. RTP does not address resource reservation and does not guarantee quality-of-service for real-time services. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers. The protocol supports the use of RTP-level translators and mixers. Further details about RTP can be found in "RTP: A Transport Protocol for Real-Time Applications", H. Schulzrinne [Columbia University], S. Casner [Packet Design], R. Frederick [Blue Coat Systems Inc.], V. Jacobson [Packet Design], RFC-3550 draft standard, Internet Engineering Steering Group, July 2003 incorporated by reference herein, in its entirety.

An example illustrating aspects of RTP is an audio conferences where the RTP is carried on top of Internet Protocol (IP) services of the Internet for voice communications. Through an allocation mechanism, an originator of the conference obtains a multicast group address and pair of ports. One port is used for audio data, and the other is used for control (RTCP) packets. This address and port information is distributed to the intended participants. The audio conferencing application used by each conference participant sends audio data in small partitions, for examples partitions of 20 ms duration. Each partition of audio data is preceded by an RTP header; and the combined RTP header and data are encapsulated into a UDP packet. The RTP header includes information about the data, for example it indicates what type of audio encoding, such as PCM, ADPCM or LPC, is contained in each packet, Time Stamp (TS) the time at which the RTP packet is to be rendered, Sequence Number (SN) a sequential number of the packet that can be used to detect lost/duplicate packets, etc. This allows senders to change the type of encoding used during a conference, for example, to accommodate a new participant that is connected through a low-bandwidth link or react to indications of network congestion.

In accordance with the RTP standard, if both audio and video media are used in an RTP conference, they are transmitted as separate RTP sessions. That is, separate RTP and RTCP packets are transmitted for each medium using two different UDP port pairs and/or multicast addresses. There is no direct coupling at the RTP level between the audio and video sessions, except that a user participating in both sessions should use the same name in the RTCP packets for both so that the sessions can be associated.

A motivation for transmitting audio and video as separate RTP sessions is to allow some participants in the conference to receive only one medium if they choose. Despite the separation, synchronized playback of a source's audio and video can be achieved using timing information carried in the RTP/RTCP packets for both sessions.

Packet networks, like the Internet, may occasionally lose, or reorder, packets. In addition, individual packets may experience variable amounts of delay in their respective transmission times. To cope with these impairments, the RTP header contains timing information and a sequence number that allow a receiver to reconstruct the timing produced by the source. This timing reconstruction is performed separately for each source of RTP packets in a session.

Even though the RTP header includes timing information and a sequence number, because the audio and video are delivered in separate RTP streams, there is potential time slip, also referred to as lip-synch or AV-synch, between the streams. An application at a receiver will have to re-synchronize these streams prior to rendering audio and video. In addition, in applications where RTP streams, such as audio and video, are transmitted over wireless networks there is an increased likelihood that packets may be lost, thereby making re-synchronization of streams more difficult.

There is therefore a need in the art for improving the synchronization of audio and video RTP streams that are transmitted over networks.

SUMMARY

Embodiments disclosed herein address the above stated needs by encoding data streams, such as an audio video stream, that is transmitted over a network, for example a wireless or IP network, such that an the data streams are synchronized. For example, an entire frame of audio and an entire frame of video are transmitted within a frame period required to render the audio and video frames by an application in the receiver. For example, a data stream synchronizer may include a first decoder configured to receive a first encoded data stream and to output a decoded first data stream, wherein the first encoded data stream has a first bit rate during an information interval. The data synchronized may also include a second decoder configured to receive a second encoded data stream and to output a decoded second data stream, wherein the second encoded data stream has a second bit rate during the information interval. A first buffer is configured to accumulate the first decoded data stream for at least one information interval and to output a frame of the first decoded data stream each interval period. A second buffer configured to accumulate the second decoded data stream for at least one information interval and to output a frame of the second decoded data stream each interval period. Then a combiner that is configured to receive the frame of first decoded data stream and the frame of second decoded data stream outputs a synchronized frame of first and second decoded data streams. The first encoded data stream may be video data, and the second encoded data stream may audio data.

An aspect of this technique includes receiving an audio and video RTP streams and assigning an entire frame of RTP video data to communication channel packets that occupy the same period, or less, as the video frame rate. Also an entire frame of RTP audio data is assigned to communication channel packets that occupy the same period, or less, as the audio frame rate. The video and audio communication channel packets are transmitted simultaneously. Receiving and assigning RTP streams can be performed in a remote station, or a base station.

Another aspect is to receive communication channel packets that include audio and video data. Decoding the audio and video data and accumulating the data for a period equal the frame period of the audio and video data. At the end of the frame period a frame of video and a frame of audio are combined. Because the audio frame and video frame are transmitted at the same time, and each transmission occurs within a frame period, the audio and video frames are synchronized. Decoding and accumulating can be performed in a remote station or a base station.

DETAILED DESCRIPTION

Figure 1:
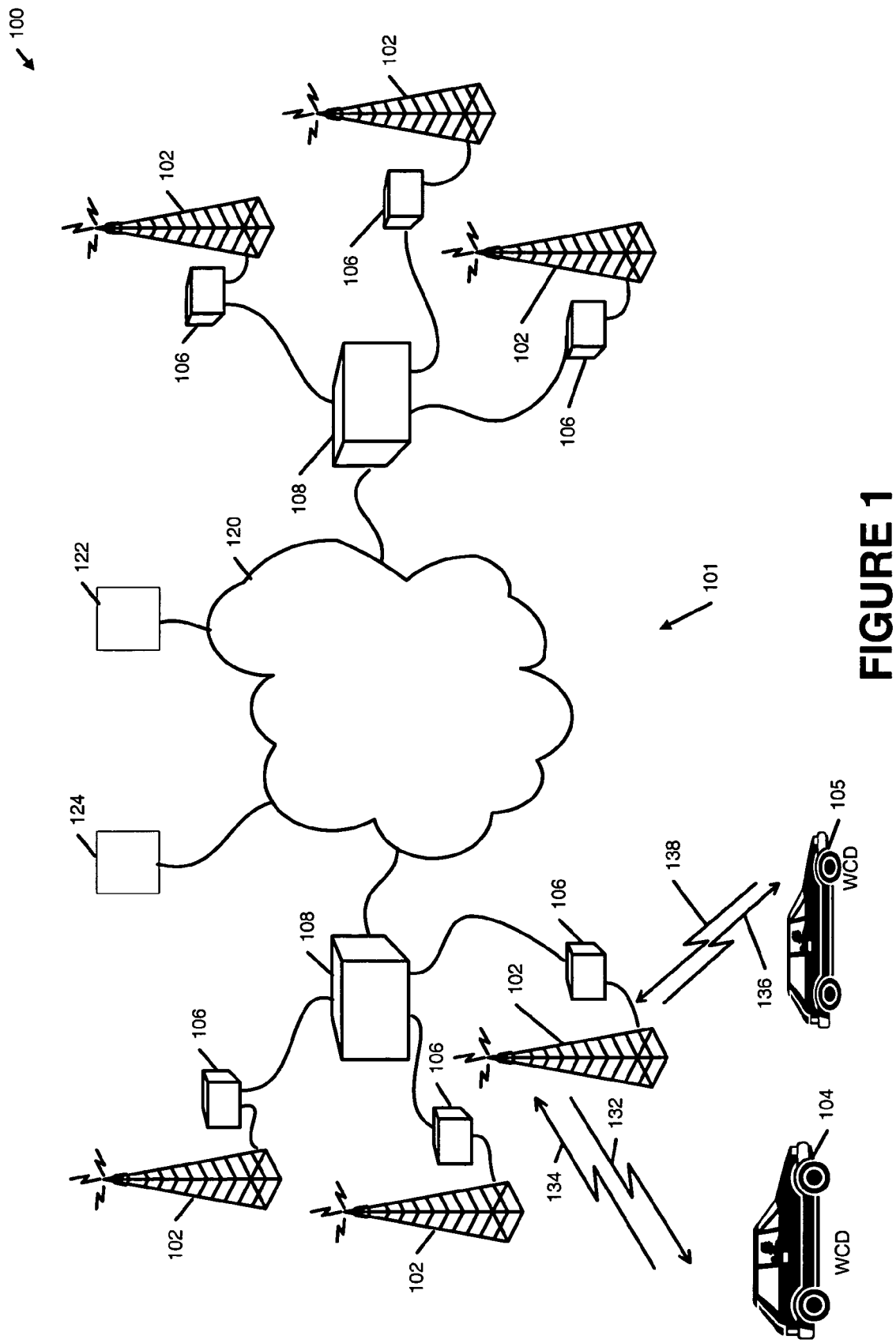
FIG. 1 is an illustration of portions of a communication system constructed in accordance with the present invention.

The word "exemplary" is used herein to mean "serving as an example, instance, or illustration." Any embodiment described herein as "exemplary" is not necessarily to be construed as preferred or advantageous over other embodiments.

The word "streaming" is used herein to mean real time delivery of multimedia data of continuous in nature, such as, audio, speech or video information, over dedicated and shared channels in conversational, unicast and broadcast applications. The phrase "multimedia frame", for video, is used herein to mean video frame that can be displayed/rendered on a display device, after decoding. A video frame can be further divided in to independently decodable units. In video parlance, these are called "slices". In the case of audio and speech, the term "multimedia frame" is used herein to mean information in a time window over which speech or audio is compressed for transport and decoding at the receiver. The phrase "information unit interval" is used herein to represent the time duration of the multimedia frame described above. For example, in case of video, information unit interval is 100 milliseconds in the case of 10 frames per second video. Further, as an example, in the case of speech, the information unit interval is typically 20 milliseconds in cdma2000, GSM and WCDMA. From this description, it should be evident that, typically audio/speech frames are not further divided in to independently decodable units and typically video frames are further divided in to slices that are independently decodable. It should be evident form the context when the phrases "multimedia frame", "information unit interval", etc. refer to multimedia data of video, audio and speech.

Techniques for synchronizing RTP streams transmitted over a set of constant bit rate communication channels are described. The techniques include partitioning information units that are transmitted in RTP streams into data packets wherein the size of the data packets are selected to match physical layer data packet sizes of a communication channel. For example, audio and video data that are synchronized to each other may be encoded. The encoder may be constrained such that it encodes the data into sizes that match available physical layer packet sizes of the communication channel. Constraining the data packet sizes to match one or more of the available physical layer packet sizes supports transmitting multiple RTP streams that are synchronized because the RTP streams are transmitted simultaneously or serially, but within the time frame the audio and video packets are required to be rendered with synchronization. For example, if audio and video RTP streams are transmitted, and the data packets are constrained so that their size matches available physical layer packets, then the audio and video data are transmitted within the display time and are synchronized. As the amount of data needed to represent the RTP stream varies the communication channel capacity varies through selection of different physical layer packet sizes as described in co-pending applications listed in REFERENCE TO CO-PENDING APPLICATIONS FOR PATENTS above.

Examples of information units, such as RTP streams, include variable bit rate data streams, multimedia data, video data, and audio data. The information units may occur at a constant repetition rate. For example, the information units may be frames of audio/video data.

Different domestic and international standards have been established to support the various air interfaces including, for example, Advanced Mobile Phone Service (AMPS), Global System for Mobile (GSM), General Packet Radio Service (GPRS), Enhanced Data GSM Environment (EDGE), Interim Standard 95 (IS-95) and its derivatives, IS-95A, IS-95B, ANSI J-STD-008 (often referred to collectively herein as IS-95), and emerging high-data-rate systems such as cdma2000, Universal Mobile Telecommunications Service (UMTS), wideband CDMA, WCDMA, and others. These standards are promulgated by the Telecommunication Industry Association (TIA), 3rd Generation partnership Project (3GPP), European Telecommunication Standards Institute (ETSI), and other well-known standards bodies.

FIG. 1 shows a communication system 100 constructed in accordance with the present invention. The communication system 100 includes infrastructure 101, multiple wireless communication devices (WCD) 104 and 105, and landline communication devices 122 and 124. The WCDs will also be referred to as mobile stations (MS) or mobiles. In general, WCDs may be either mobile or fixed. The landline communication devices 122 and 124 can include, for example, serving nodes, or content servers, that provide various types of multimedia data such as streaming multimedia data. In addition, MSs can transmit streaming data, such as multimedia data.

The infrastructure 101 may also include other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, IP networks, or the public switched telephone network (PSTN).

The term "forward link" or "downlink" refers to the signal path from the infrastructure 101 to a MS, and the term "reverse link" or "uplink" refers to the signal path from a MS to the infrastructure. As shown in FIG. 1, MSs 104 and 105 receive signals 132 and 136 on the forward link and transmit signals 134 and 138 on the reverse link. In general, signals transmitted from a MS 104 and 105 are intended for reception at another communication device, such as another remote unit, or a landline communication device 122 and 124, and are routed through the switching network 120. For example, if the signal 134 transmitted from an initiating WCD 104 is intended to be received by a destination MS 105, the signal is routed through the infrastructure 101 and a signal 136 is transmitted on the forward link to the destination MS 105. Likewise, signals initiated in the infrastructure 101 may be broadcast to a MS 105. For example, a content provider may send multimedia data, such as streaming multimedia data, to a MS 105. Typically, a communication device, such as a MS or a landline communication device, may be both an initiator of and a destination for the signals.

Examples of a MS 104 include cellular telephones, wireless communication enabled personal computers, and personal digital assistants (PDA), and other wireless devices. The communication system 100 may be designed to support one or more wireless standards. For example, the standards may include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), IS2000, HRPD, cdma2000, Wideband CDMA (WCDMA), and others.

Figure 2:
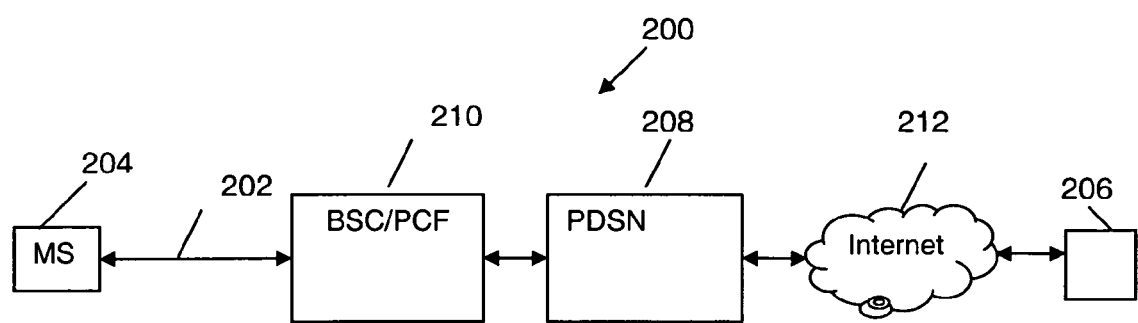
FIG. 2 is a block diagram illustrating an exemplary packet data network and various air interface options for delivering packet data over a wireless network in the FIG. 1 system.

FIG. 2 is a block diagram illustrating an exemplary packet data network and various air interface options for delivering packet data over a wireless network. The techniques described may be implemented in a packet switched data network 200 such as the one illustrated in FIG. 2. As shown in the example of FIG. 2, the packet switched data network system may include a wireless channel 202, a plurality of recipient nodes or MS 204, a sending node or content server 206, a serving node 208, and a controller 210. The sending node 206 may be coupled to the serving node 208 via a network 212 such as the Internet.

The serving node 208 may comprise, for example, a packet data serving node (PDSN) or a Serving GPRS Support Node (SGSN) or a Gateway GPRS Support Node (GGSN). The serving node 208 may receive packet data from the sending node 206, and serve the packets of information to the controller 210. The controller 210 may comprise, for example, a Base Station Controller/Packet Control Function (BSC/PCF) or Radio Network Controller (RNC). In one embodiment, the controller 210 communicates with the serving node 208 over a Radio Access Network (RAN). The controller 210 communicates with the serving node 208 and transmits the packets of information over the wireless channel 202 to at least one of the recipient nodes 204, such as an MS.

In one embodiment, the serving node 208 or the sending node 206, or both, may also include an encoder for encoding a data stream, or a decoder for decoding a data stream, or both. For example the encoder could encode an audio/video stream and thereby produce frames of data, and the decoder could receive frames of data and decode them. Likewise, a MS may include an encoder for encoding a data stream, or a decoder for decoding a received data stream, or both. The term "codec" is used to describe the combination of an encoder and a decoder.

In one example illustrated in FIG. 2, data, such as multimedia data, from the sending node 206 which is connected to the network, or Internet 212 can be sent to a recipient node, or MS 204, via the serving node, or Packet Data Serving Node (PDSN) 206, and a Controller, or Base Station Controller/Packet Control Function (BSC/PCF) 208. The wireless channel 202 interface between the MS 204 and the BSC/PCF 210 is an air interface and, typically, can use many channels for signaling and bearer, or payload, data.

The air interface 202 may operate in accordance with any of a number of wireless standards. For example, the standards may include standards based on TDMA, such as Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

Figure 3:
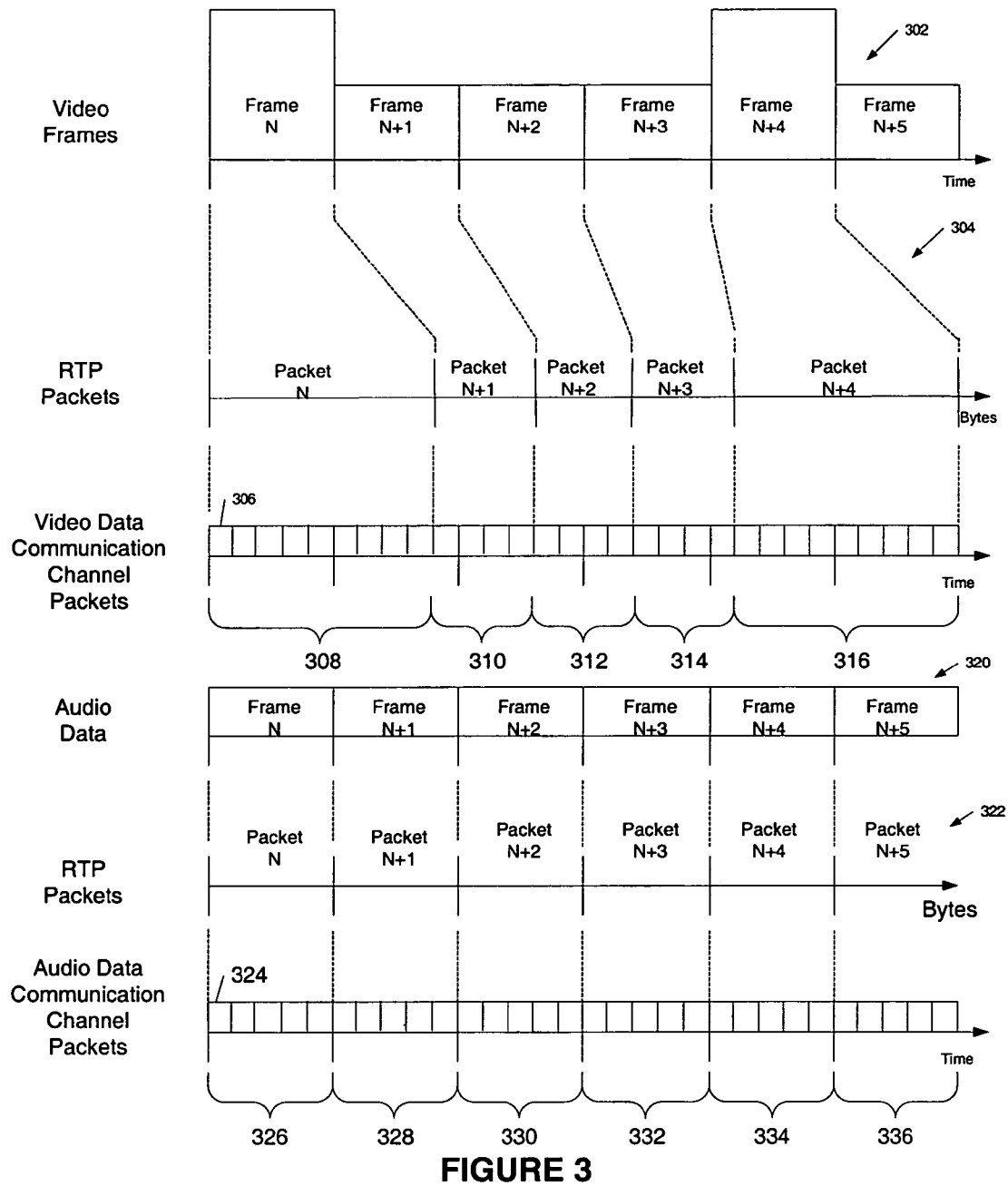
FIG. 3 is a chart illustrating synchronization difficulties in a conventional technique for transmission of separate RTP streams over a wireless communication channel.

FIG. 3 is a chart illustrating synchronization difficulties in a conventional technique for transmission of separate RTP streams over a wireless communication channel. In the example illustrated in FIG. 3, frames of video and audio data are encoded into RTP streams and then assigned to communication channel packets. FIG. 3 illustrates a stream of video frames 302. Typically, video frames occur at a constant rate. For example, video frames may occur at a 10 Hz rate, that is a new frame occurs every 100 milliseconds.

As shown in FIG. 3, the individual video frames may contain different amounts of data, as indicated by the height of the bar representing each frame. For example, if the video data is encoded as Motion Picture Expert Group (MPEG) data then the video stream is made up of intra frames (I frames), and predictive frames (P frames) An I frame is self-contained, that is, it includes all of the information needed to render, or display, one complete frame of video.

A P frame is not self-contained and will typically contain differential information relative to the previous frame, such as motion vectors and differential texture information. Typically, I frames may be up to 8 to 10 times larger that a P frame, depending on the content and encoder settings. Even though the video frames may have different amounts of data they still occur at a constant rate. I and P frames can be further partitioned in to multiple video slices. A video slice represents a smaller region in the display screen and can be individually decoded by the decoder.

In FIG. 3, video frame N and N+4 could represent I frames, and video frames N+1, N+2, N+3, and N+5 could represent P frames. As shown, the I frames include a larger amount of data, indicated by the height of the bar representing the frame, than the P frames. The video frames are then packetized into packets in an RTP stream 304. As shown in FIG. 3, RTP packets N and N+4, corresponding to video I frames N and N+4, are larger, as indicated by their width, than RTP packets N+1, N+2, and N+3, corresponding to video P frames N+1, N+2, and N+3.

The video RTP packets are allocated to communication channel packets 306. In a conventional communication channel, such as CDMA or GSM, the communication channel data packets 306 are a constant size, and are transmitted at a constant rate. For example, the communication channel data packets 306 may be transmitted at a 50 Hz rate, that is, a new data packet is transmitted every 20 milliseconds. Because the communication channel packets are a constant size, it takes more communication channel packets to transmit the larger RTP packets. Thus, it takes more communication channel packets 306 to transmit RTP packets corresponding to I video frames N and N+4, than communication channel packets needed to transmit the smaller RTP packets corresponding to P video frames N+1, N+2 and N+3. In the example illustrated in FIG. 3, video frame N occupies a block 308 of nine communication channel packets 306. Video frames N+1, N+2, and N+3 occupy blocks 310, 312, and 314 respectively, each with four communication channel packets 306. Video frame N+4 occupies a block 316 of nine communication channels packets 306.

For each frame of video data there is a corresponding audio data. FIG. 2 illustrates a stream of audio frames 320. Each audio frame N, N+1, N+2, N+3, N+4, and N+5 corresponds to the respective video frame and occurs at a 10 Hz rate, that is a new audio frame begins every 100 milliseconds. In general, the audio data is less complex, such that it can be represented by fewer bits, than the associated video data and is typically encoded such that RTP packets 322 are of a size that can be transmitted over the communication channel within the period of a frame. Further, typical audio frames are generated once every 20 milliseconds in CDMA, GSM, WDCMA, etc. Multiple audio frames are bundled in such cases, such that audio and video packets represent same time duration for RTP packetization. For example, RTP packets N, N+1, N+2, N+3, N+4, and N+5 are of a size that each RTP packet can be assigned to communication channel packets 324 such that each RTP packet can be transmitted over the communication channel within a 100 millisecond frame period.

As shown in FIG. 3, audio frame packet N, N+1, N2, N+3, N+4, and N+5 each occupy blocks 326, 328, 330, 332, 334, and 336 respectively, each with five communication channel packets 324.

Comparison between the assignment of the video frames and audio frames to their respective communication channel packets illustrates the loss of synchronization between the audio and video frames. In the example illustrated in FIG. 3, a block 308 of nine communication channel packets 306 is required to transmit video frame N. Audio frame N associated with the video frame N was transmitted in a block 326 of five communication channel packets 324. Because the video and audio in communication channel packets are transmitted at the same time, during the transmission of video frame N, audio frame N, as well as four of the five communication channel packets in the block 328 of audio frame N+1 are transmitted.

For example, in FIG. 3, if the video, and associated audio, frame rate is 10 Hz and the communication channel packet rate is 50 Hz, then during the 100 millisecond period of frame N, all of the audio data is transmitted, but only a portion of the video data is transmitted. In this example, all of the video date for frame N is not transmitted until another four communication channel packets 306 have been transmitted resulting in the complete video frame N requiring 180 millisecond for transmission compared to the 100 milliseconds for complete transmission of audio frame N. Because, the audio and video RTP streams are independent, a portion of audio frame N+1 data is transmitted during the time that video frame N data is transmitted. This loss of synchronization between the video and audio streams can result in "slip" between the video and audio at a receiver of the communication channel.

Because video encoders such as H.263, AVC/H.264, MPEG-4, etc. are inherently variable rate in nature due to predictive coding and also due to the use of variable length coding (VLC) of many parameters, real time delivery of variable rate bitstreams over circuit switched networks and packet switched networks is generally accomplished by traffic shaping with buffers at the sender and receiver. Traffic shaping buffers introduces additional delay which is typically undesirable. For example, additional delay can be annoying during teleconferencing when there is delay between when a person speaks and when another person hears the speech.

For example, because video at a receiver of the communication channel is played back at the same rate as the original video frame rate, delays in the communication channel can cause pauses in the playback. In FIG. 3, video frame N cannot be played back until data of the entire frame has been received. Because the entire frame data is not received during the frame period, playback has to be paused until all of the video data for frame N is received. In addition, all of the data from audio frame N needs to be stored until all of the video data for frame N is received so that playback of the audio and video is synchronized. It is also noted that audio data from frame N+1 that is received while the video data from frame N is still being received, must be stored until all of the video data from frame N+1 is received. Because of the variable size of the video frames, large traffic shaping buffers are required to accomplish synchronization.

Figure 4:
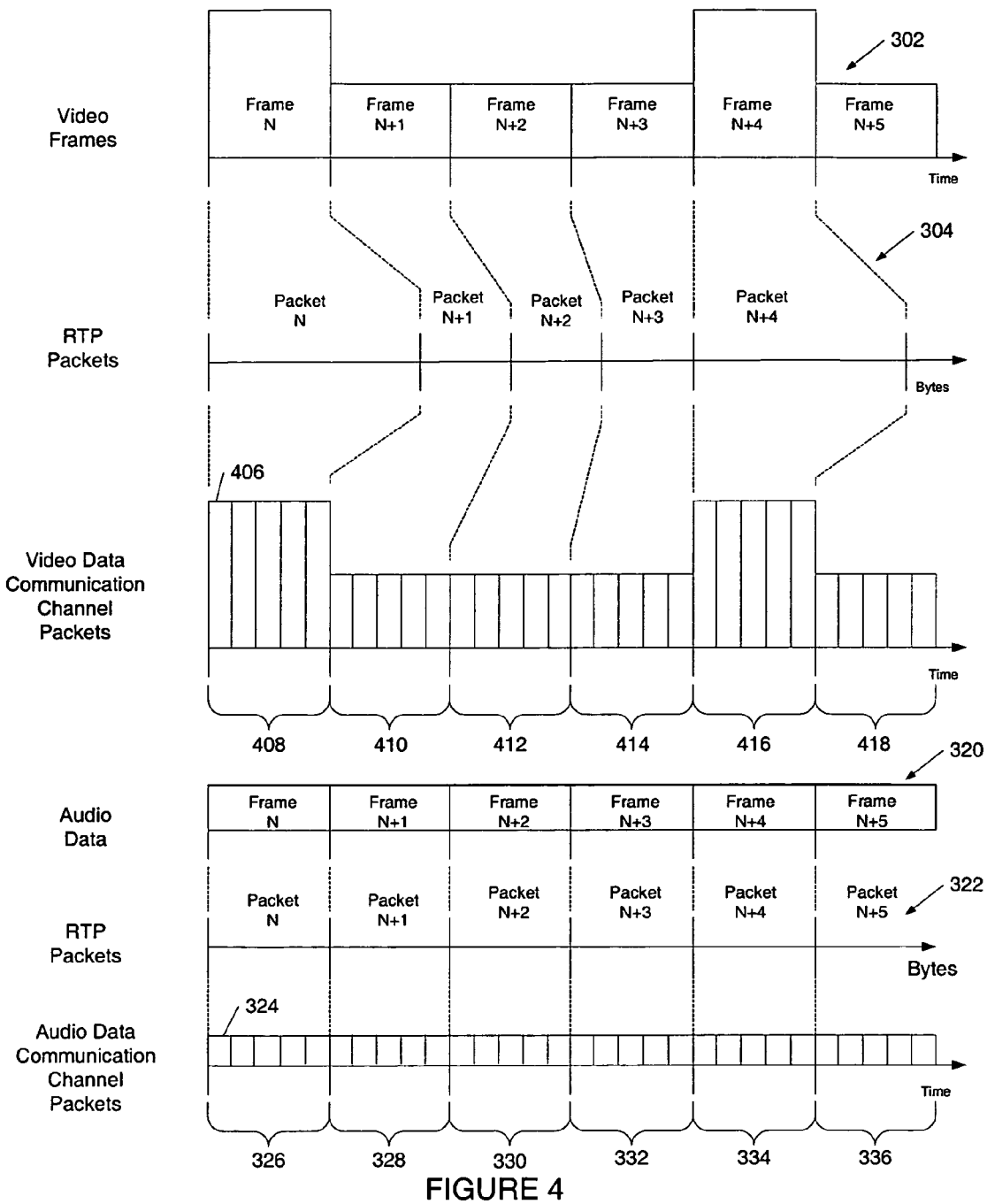
FIG. 4 is a chart illustrating a technique for transmission of separate RTP streams over a wireless communication channel in accordance with the invention.

FIG. 4 is a chart illustrating a technique for transmission of separate RTP streams over a wireless communication channel in accordance with the invention. FIG. 4, similarly to FIG. 3, illustrates a stream of video frames 302 of varying size, and a stream of audio frames 320 that are encoded into independent RTP streams 304 and 322 respectively. The video and audio frames occur at a constant rate, for example a 10 Hz rate.

In FIG. 4, as in FIG. 3, video frame N and N+4 could represent I frames, and video frames N+1, N+2, N+3, and N+5 could represent P frames. The video frames are packetized into packets in an RTP stream 304. As shown in FIG. 4, RTP packets N and N+4, corresponding to video I frames N and N+4, are larger, as indicated by their width, than RTP packets N+1, N+2, and N+3, corresponding to video P frames N+1, N+2, and N+3.

The video RTP packets are allocated to communication channel packets 406. Using techniques as described in co-pending application listed in REFERENCE TO CO-PENDING APPLICATIONS FOR PATENT above, the capacity of the communication channel is variable. Because of the variable capacity of the communication channel packets 406, the video frame N can be transmitted in a block 408 containing five communication channel packets 406.

In a conventional communication channel, such as standards based on CDMA such as TIA/EIA-95-B (IS-95), TIA/EIA-98-C (IS-98), IS2000, HRPD, cdma2000, and Wideband CDMA (WCDMA), the communication channel data packets 406 may be transmitted at a 50 Hz rate, that is, a new data packet is transmitted every 20 milliseconds. Because the communication channel packets 406 capacity can be varied, the encoding of the video frame N can be constrained such that the entire video frame N can be transmitted during a frame period. As shown in FIG. 4, the capacity of the communication channel packets 406 is increased when transmitting the RTP packet N, corresponding to video frame N, so that the entire packet can be transmitted during the frame period. The techniques described can also be applied to communication channels based on GSM, GPRS, or EDGE.

As illustrated in FIG. 4, video frames N, N+1, N+2, N+3, N+4, and N+5 are encoded into RTP packets and assigned to communication channel blocks 408, 410, 412, 414, 416, and 418 respectively. It is also noted that by varying the communication channel capacity the entire video frame is transmitted within a frame period. For example, if the video frame rate is 10 Hz then an entire frame of video data is transmitted during a 100 millisecond frame period.

For each frame of video data 302 there is a corresponding audio frame 320. Each audio frame N, N+1, N+2, N+3, N+4, and N+5 corresponds to the respective video frame and occurs at a 10 Hz rate, that is a new audio frame begins every 100 milliseconds. As discussed in relation to FIG. 3, the audio data is generally less complex, such that it can be represented by fewer bits, than the associated video data and is typically encoded such that RTP packets 322 that are of a size that can be transmitted over the communication channel within the 100 millisecond period of a frame. That is, audio RTP packets N, N+1, N+2, N+3, N+4, and N+5 are of a size that each RTP packet can be assigned to blocks 326, 328, 330, 332, 334, and 336 of communication channel packets respectively. Thus, if the video frame rate is 10 Hz then each video frame can be transmitted over the communication channel within a 100 millisecond frame period. Similarly to video, if the audio packet size is large, the communication channel capacity can also be varied to support the transmission of an entire audio frame during a frame period.

In FIG. 4, comparison between the assignment of the video frames and audio frames to their respective communication channel packets illustrates that the video and audio frames remain synchronized. In other words, every frame period an entire video and an entire audio frame are transmitted. Because an entire frame of video and audio are transmitted each frame period there is no need for additional buffering. The received video and audio data need only be accumulated during a frame period and then it can be played out. Because there is no delay introduced by the communication channel the video and audio frames remain synchronized.

It is noted that, as illustrated in FIG. 3, video frames N+1, N+2 and N+3 only required four video communication channel packets 306 to transmit the entire frame of video data. As illustrated in FIG. 4, the video communication channel packets 406 may be reduced in size so that the video data fits into five packets, or blank packets may be transmitted. Similarly, blank packets may be transmitted if there is excess capacity available in the audio communication channel. Thus, the video and audio data is encoded so that an entire frame of audio and video data is assigned to communication channel packets that occupy the same period, or less, or the respective frame rate.

As described below, depending on aspects of the communication network, different techniques can be used to synchronize RTP streams. For example, the communication network may be over provisioned, that is it has excess capacity, or the communication network may have a guaranteed Quality of Service. In addition, the RTP streams may be modified so as to maintain synchronization when transmitted over a communication network. Each of these techniques will be discussed below.

Over Provisioned Communication Network

In the scenario when a communication link between PDSN 208 and the sender 206 is over provisioned, that is, there is excess capacity available for transmission of data over the wireline Internet, then there is no delay due to congestion. Because there is excess capacity in the communication link there is no need to delay a transmission so that the transmission can be accommodated by the communication link. With no delay in transmission there is no "time slip" between voice and video packets as they arrive at the infrastructure, such as at a PDSN. In other words, the audio and video data remain synchronized to each other up to the PDSN and the synchronization is maintained between the PDSN and the MS, as described in this invention.

In the over provisioned scenario, audio-visual synchronization is easily accomplished. For example, video data may have a frame rate of 10 frames per second (fps), based on a 100 millisecond frame, and the associated audio may have a frame rate of 50 fps, based on a 20 millisecond speech frame. In this example, five frames of received audio data would be buffered, so that it would be synchronized with the video frame rate. That is, five frames of audio data would be buffered, corresponding to 100 milliseconds of audio data, so that it would be synchronized to the 100 millisecond video frame.

Communication Networks with a Guaranteed QoS on Maximum Delay

By buffering an appropriate number of higher frame rate speech frames it is possible to match a lower frame rate video frame. In general, if video packets are delivered with a quality of service (QoS) delay guarantee:

$$QoS\_delay = nT \text{ ms} \qquad \text{Eq. 1}$$

where n is the delay in frames; and $$T = 1000/frames\_per\_second$$

Then a buffer sized to store nT/w speech frames, where w is the duration of speech frames in milliseconds, is needed to store enough speech frames to ensure that the speech and video can be synchronized. In cdma2000 UMTS, the duration of a speech frame, w, is 20 milliseconds, in other communication channels the duration of a speech frame may be different, or vary.

Another technique for synchronization of audio and video data includes buffering both data streams. For example, if a communication system has a guaranteed maximum delay of $D_Q$ milliseconds, meaning that $D_Q$ is the maximum delay that can be experienced during the transmission of audio and video streams, then an appropriate sized buffer can be employed to maintain synchronization.

For example, with a guaranteed maximum delay of $D_Q$, then buffering $D_Q/T$ video frames (T is the duration of video frames in milliseconds) and $D_Q/w$ speech frames (w is the duration of speech frames in milliseconds) will ensure audio video synchronization (AV-synch). These additional buffer spaces are commonly called a de-jitter buffer.

The techniques described synchronization of audio and video data streams. The techniques can be used with any data streams that need to be synchronized. If there are two data streams, a first higher bit rate data stream and a second lower bit rate data stream that have the same information interval and need to be synchronized, then buffering the higher bit rate data allows it to be synchronized with the lower bit rate data. The size of the buffer can be determined, depending on a QoS as described above. Likewise, both the higher and lower bite rate data streams can be buffered and synchronized as described above.

The techniques described can be performed by a data stream synchronizer that includes a first decoder configured to receive a first encoded data stream and to output a decoded first data stream, wherein the first encoded data stream has a first bit rate during an information interval. And a second decoder configured to receive a second encoded data stream and to output a decoded second data stream, wherein the second encoded data stream has a second bit rate during the information interval. The data stream synchronized also includes a first buffer configured to accumulate the first decoded data stream for at least one information interval and to output a frame of the first decoded data stream each interval period, and a second buffer configured to accumulate the second decoded data stream for at least one information interval and to output a frame of the second decoded data stream each interval period. Then a combiner configured to receive the frame of first decoded data stream and the frame of second decoded data stream and to output a synchronized frame of first and second decoded data streams. In one example, the first encoded data stream may be video data and the second encoded data stream is audio data, such that the first bit rate is higher than the second bit rate.

Single RTP Stream with Audio and Video Multiplexed

Another embodiment is to carry audio and video in a single RTP stream. As noted, it is not common practice in IP networks to transmit audio and video as a single RTP stream. RTP was designed to enable participants with different resources, for example, terminals capable of both video and audio, and terminals capable of only audio, to communicate in the same multimedia conference.

The restriction of transmitting audio and video as separate RTP streams may not be applicable in a wireless network for video services. In this case, a new RTP profile may be designed to carry specific speech and video codec payloads. Combination of audio and video into a common RTP stream eliminates any time slip between the audio and video data without requiring an over provisioned communication network. Hence, audio video synchronization can be accomplished using techniques described in connection with an over provisioned network as described above.

Figure 5:
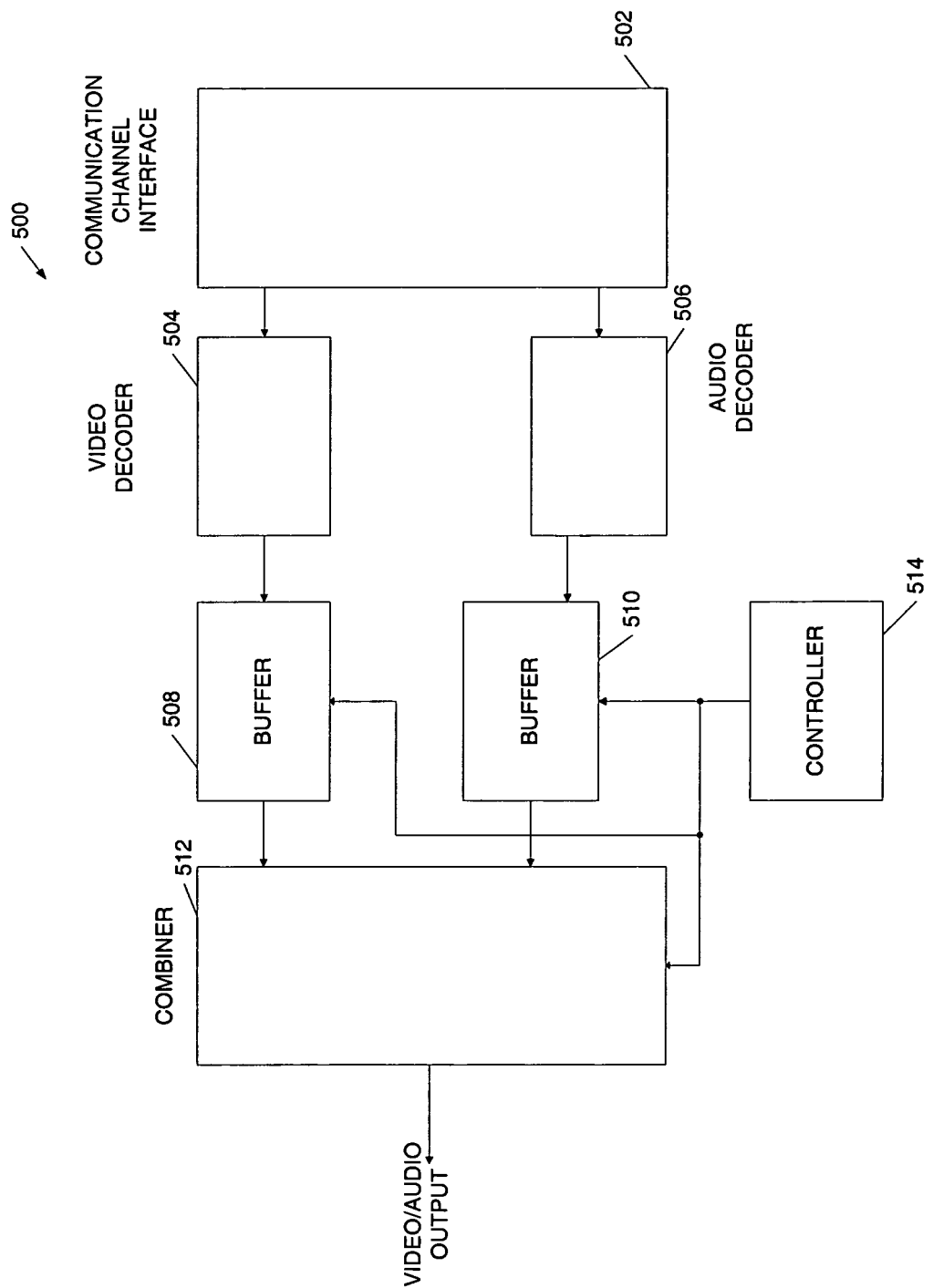
FIG. 5 is a block diagram of a portion of a wireless audio/video receiver configured to receive communication channel packets.

FIG. 5 is a block diagram of a portion of a wireless audio/video receiver 500 configured to receive communication channel packets. As shown in FIG. 5, the audio/video receiver 500 includes a communication channel interface 502 configured to receive communication channel packets.

The communication channel interface 502 outputs video communication channel packet to a video decoder 504 and audio communication channel packets to an audio decoder 506. The video decoder 504 decodes the video communication channel packets and outputs video data to a video buffer 508. The audio decoder 506 decodes the audio communication channel packets and outputs audio data to an audio buffer 510. The video buffer 508 and audio buffer accumulate video and audio data respectively for a frame period. The video buffer 508 and audio buffer 510 output a video frame and an audio frame respectively to a combiner 512. The combiner 512 is configured to combine the video and auto frames and to output a synchronized audio video signal. Operation of the video buffer 508, audio buffer 510 and combiner 512 may be controlled by a controller 514.

Figure 6:
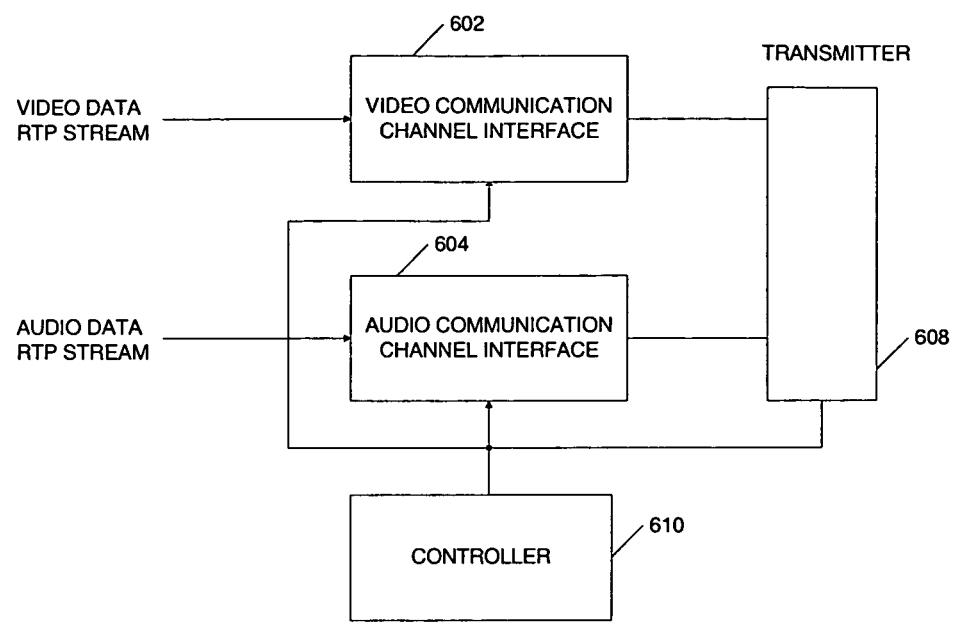
FIG. 6 is a block diagram of a portion of a wireless audio/video transmitter configured to transmit communication channel packets.

FIG. 6 is a block diagram of a portion of a wireless audio/video transmitter 600 configured to transmit communication channel packets. As shown in FIG. 6, the audio/video transmitter 600 includes a video communication channel interface 602 configured to receive a video data RTP stream. The video communication channel interface assigns the RTP packets to the communication channel packets. As noted, the capacity of the communication channel packets may vary so as to assign an entire frames worth of RTP video data to communication channel packets that occupy the same period as the video frame. The audio/video transmitter 600 also includes an audio communication channel interface 604 configured to receive an audio data RTP stream. The audio communication channel interface 604 assigns the RTP packets to the communication channel packets. As noted, in general, the capacity of the communication channel packets will be sufficient to assign an entire frame of RTP audio data to communication channel packets that occupy the same period as the audio frame. If the channel capacity is not sufficient then it may be varied, similarly to the video communication channel packets so that there will be sufficient capacity to assign an entire frame of RTP audio data to communication channel packets that occupy the same period as the audio frame.

The video and audio communication channel packets are output by the video and audio communication channel interfaces 602 and 604 respectively and communicated to a combiner 606. The combiner 606 is configured to accept the video and audio communication channel packets and to combine them and to output a composite signal. The output of the combiner 606 is communicated to a transmitter 608 that transmits that composite signal to the wireless channel. Operation of the video communication channel interface 602, audio communication channel interface 604 and combiner 606 may be controlled by a controller 614.

Figure 7:
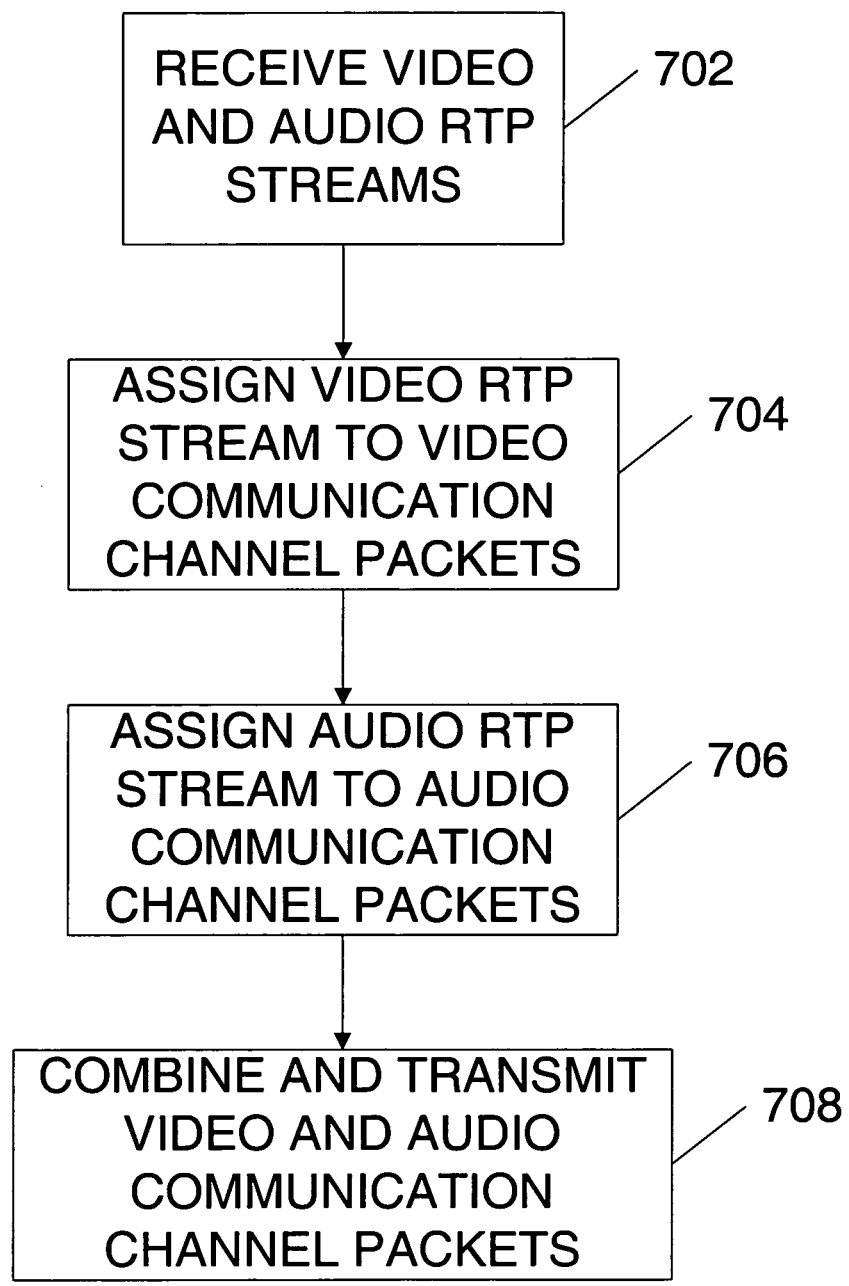
FIG. 7 is a flow chart of transmission of independent RTP streams over a wireless communication link.

FIG. 7 is a flow chart of transmission of independent RTP streams over a wireless communication link. Flow starts in block 702 where video and audio RTP data streams are received. Flow then continues to block 704 where the video RTP stream is assigned to communication channel packets. In block 706 the audio RTP stream is assigned to communication channel packets. In block 708 the video and audio communication channel packets are combined and transmitted over a wireless channel.

Figure 8:
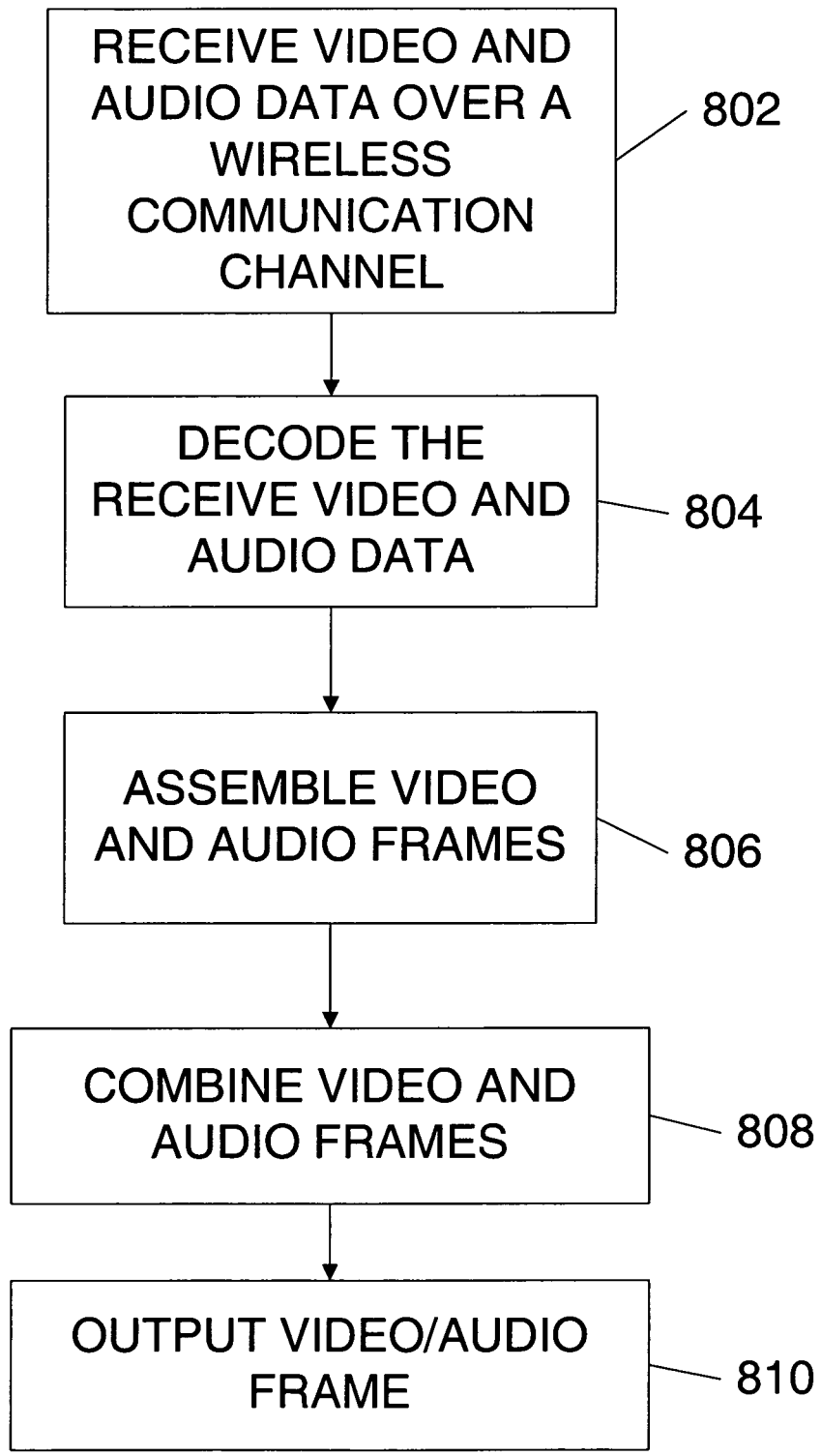
FIG. 8 is a flow chart of reception audio and video data over a wireless communication channel.

FIG. 8 is a flow chart of reception audio and video data over a wireless communication channel. Flow begins in block 802 where video and audio data is received over a wireless communication channel. Flow continues to block 804 the video and audio data is decoded. In block 806, the decoded video and audio data are assembled into respective video and audio frames. In block 810 the video and audio data are combined into a synchronized video/audio frame. In block 810, the synchronized video/audio frame is output.

Figure 9:
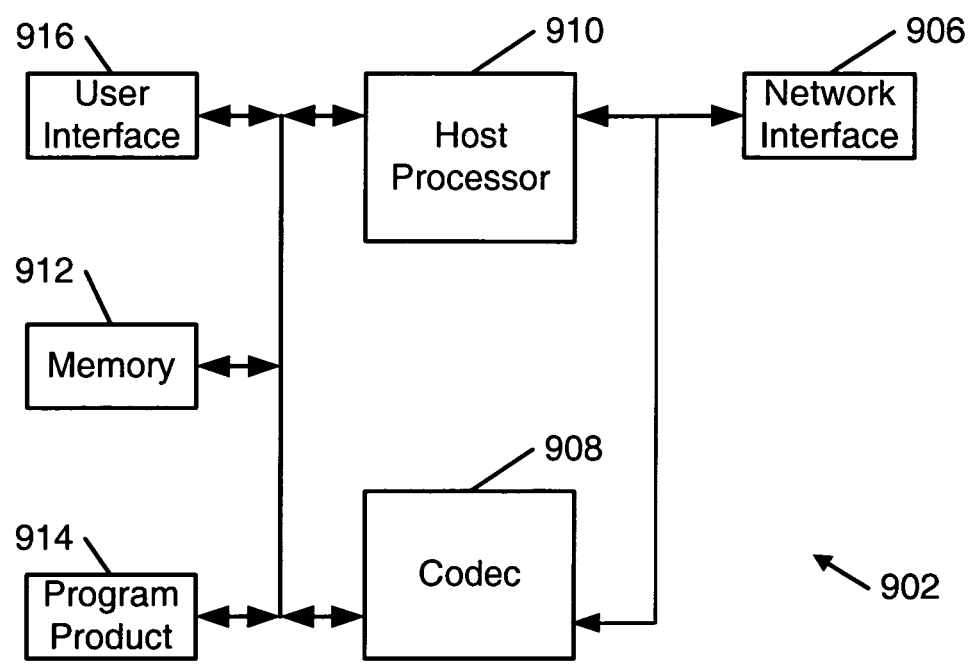
FIG. 9 is a block diagram of a wireless communication device, or a mobile station (MS), constructed in accordance with an exemplary embodiment of the present invention.

FIG. 9 is a block diagram of a wireless communication device, or a mobile station (MS), constructed in accordance with an exemplary embodiment of the present invention. The communication device 902 includes a network interface 906, codec 908, a host processor 910, a memory device 912, a program product 914, and a user interface 916.

Signals from the infrastructure are received by the network interface 906 and sent to the host processor 910. The host processor 910 receives the signals and, depending on the content of the signal, responds with appropriate actions. For example, the host processor 910 may decode the received signal itself, or it may route the received signal to the codec 908 for decoding. In another embodiment, the received signal is sent directly to the codec 908 from the network interface 906.

In one embodiment, the network interface 906 may be a transceiver and an antenna to interface to the infrastructure over a wireless channel. In another embodiment, the network interface 906 may be a network interface card used to interface to the infrastructure over landlines. The codec 908 may be implemented as a digital signal processor (DSP), or a general processor such as a central processing unit (CPU).

Both the host processor 910 and the codec 908 are connected to a memory device 912. The memory device 812 may be used to store data during operation of the WCD, as well as store program code that will be executed by the host processor 910 or the DSP 908. For example, the host processor, codec, or both, may operate under the control of programming instructions that are temporarily stored in the memory device 912. The host processor 910 and codec 908 also can include program storage memory of their own. When the programming instructions are executed, the host processor 910 or codec 908, or both, perform their functions, for example decoding or encoding multimedia streams, such as audio/video data and assembling the audio and video frames. Thus, the programming steps implement the functionality of the respective host processor 910 and codec 908, so that the host processor and codec can each be made to perform the functions of decoding or encoding content streams and assembling frames as desired. The programming steps may be received from a program product 914. The program product 914 may store, and transfer the programming steps into the memory 912 for execution by the host processor, codec, or both.

The program product 914 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 914 may be the source file including the program steps that is received from the network and stored into memory and is then executed. In this way, the processing steps necessary for operation in accordance with the invention may be embodied on the program product 914. In FIG. 9, the exemplary storage medium is shown coupled to the host processor 910 such that the host processor may read information from, and write information to, the storage medium. Alternatively, the storage medium may be integral to the host processor 910.

The user interface 916 is connected to both the host processor 910 and the codec 908. For example, the user interface 916 may include a display and a speaker used to output multimedia data to the user.

Those of skill in the art will recognize that the step of a method described in connection with an embodiment may be interchanged without departing from the scope of the invention.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A data stream synchronizer, comprising:
a communication channel interface configured to receive a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data stream;
a first decoder coupled to the communication channel interface to receive the first blocks of communication channel packets corresponding to the encoded video data stream and to output a decoded video data stream;
a second decoder coupled to the communication channel interface to receive the second blocks of communication channel packets corresponding to the encoded audio data stream and to output a decoded audio data stream;
a first buffer configured to accumulate the decoded video data stream and to output one frame of the decoded video data stream each video frame period;
a second buffer configured to accumulate the decoded audio data stream and to output one frame of the decoded audio data stream each audio frame period; and
a combiner configured to receive the one frame of the decoded video data stream and the one frame of the decoded audio data stream and to output a synchronized frame of audio/video data every video frame period, wherein the output synchronized frame of audio/video data includes only one frame of audio data per video frame period.

2. The data stream synchronizer of claim 1, wherein each block in the second blocks of communication channel packets occupies a period that is the same or less than the video frame period of the encoded video data stream.

3. The data stream synchronizer of claim 1, wherein each block in the first blocks of communication channel packets occupies a period that is the same occupied by each block in the second blocks of communication channel packets.

4. The data stream synchronizer of claim 1, wherein each block in the first blocks of communication channel packets includes the same number of communication channel packets as each of the other blocks in the first blocks of communication channel packets.

5. The data stream synchronizer of claim 4, wherein each block in the first block of communication channel packets has a variable capacity adjustable based on the video frames of varying sizes.

6. The data stream synchronizer of claim 1, wherein each block in the first blocks of communication channel packets includes the same number of communication channel packets as included in each block in the second blocks of communication channel packets.

7. The data stream synchronizer of claim 1, wherein at least one block in the first blocks of communication channel packets includes a blank communication channel packet.

8. A remote station apparatus, comprising:
a communication channel interface configured to receive a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data, wherein the encoded video data is encoded from video frames of varying sizes, and wherein each block in the first blocks of communication channel packets occupies a period that is the same or less than a video frame period of the encoded video data irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data;
a video decoder coupled to the communication channel interface to receive the first blocks of communication channel packets corresponding to the encoded video data and to output decoded video data;
an audio decoder coupled to the communication channel interface to receive the second blocks of communication channel packets corresponding to the encoded audio data and to output decoded audio data;
a video buffer configured to accumulate the decoded video data for at least one video frame period and to output one frame of the decoded video data each video frame period;
an audio buffer configured to accumulate the decoded audio data for multiple audio frame periods and to output one frame of the decoded audio data each audio frame period; and
a combiner configured to receive the one frame of the decoded video data and the one frame of the decoded audio data and configured to output a synchronized frame of decoded audio/video data every video frame period, wherein the output synchronized frame of decoded audio/video data includes only one frame of audio data per video frame period.

9. The remote station apparatus of claim 8, wherein the video decoder is at least one of an MPEG decoder, H.263 decoder, and H.264 decoder.

10. The remote station apparatus of claim 8, wherein the audio decoder is at least one of an MPEG decoder, H.263 decoder, and H.264 decoder.

11. The remote station apparatus of claim 8, further comprising a control processor configured to control the audio decoder, the video decoder, and the combiner.

12. A base station apparatus, comprising:
a communication channel interface configured to receive a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data, wherein the encoded video data is encoded from video frames of varying sizes, and wherein each block in the first blocks of communication channel packets occupies a period that is the same or less than a video frame period of the encoded video data irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data;
a video decoder coupled to the communication channel interface to receive the first blocks of communication channel packets corresponding to the encoded video data and to output decoded video data;
an audio decoder coupled to the communication channel interface to receive the second blocks of communication channel packets corresponding to the encoded audio data via the wireless communication network and to output decoded audio data;
a video buffer configured to accumulate the decoded video data for a video frame period and to output one frame of the decoded video data during the video frame period;
an audio buffer configured to accumulate the decoded audio data for an audio frame period and to output one frame of the decoded audio data during the audio frame period; and
a combiner configured to receive the one frame of the decoded video data and the one frame of the decoded audio data and to output a synchronized frame of audio/video data every video frame period, wherein the output synchronized frame of audio/video data includes only one frame of audio data per video frame period.

13. The base station apparatus of claim 12, wherein the video decoder is at least one of an MPEG decoder, H.263 decoder, and H.264 decoder.

14. The base station apparatus of claim 12, wherein the audio decoder is at least one of an MPEG decoder, H.263 decoder, and H.264 decoder.

15. The base station apparatus of claim 12, further comprising a control processor configured to control the audio decoder, the video decoder, and the combiner.

16. A method for decoding and synchronizing data streams, comprising:
receiving a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data stream;
decoding the encoded video data stream, and outputting a decoded video data stream;
decoding the encoded audio data stream, and outputting a decoded audio data stream;
accumulating the decoded video data stream and outputting one frame of the decoded video data stream each video frame period;
accumulating the decoded audio data stream and outputting one frame of the decoded audio data stream each audio frame period; and
combining the one frame of the decoded video data stream with the one frame of the decoded audio data stream and outputting a synchronized frame of audio/video data every video frame period, wherein the output synchronized frame of audio/video data includes only one frame of audio data per video frame period.

17. A method for decoding and synchronizing audio and video data, comprising:
receiving a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data, wherein the encoded video data is encoded from video frames of varying sizes, and wherein each block in the first blocks of communication channel packets occupies a period that is the same or less than a video frame period of the encoded video data irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data;
outputting decoded video data in response to the encoded video data;
outputting decoded audio data in response to the encoded audio data;
accumulating the decoded video data for a video frame period and outputting one frame of the decoded video data each video frame period;
accumulating the decoded audio data for an audio frame period and outputting one frame of the decoded audio data each audio frame period; and combining the one frame of the decoded video data with the one frame of the decoded audio data and outputting a synchronized frame of decoded audio/video data every video frame period, wherein the output synchronized frame of decoded audio/video data includes only one frame of audio data per video frame period.

18. A non-transitory computer-readable media, comprising instructions stored thereon that, if executed by a processor, cause the processor to control execution of a method for decoding and synchronizing data streams, the method comprising:
receiving a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data stream, wherein the encoded video data stream includes is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data stream;
decoding the encoded video data stream, and outputting a decoded video data stream;
decoding the encoded audio data stream, and outputting a decoded audio data stream;
accumulating the decoded video data stream and outputting one frame of the decoded video data stream each video frame period;
accumulating the decoded audio data stream and outputting one frame of the decoded audio data stream each audio frame period; and
combining the one frame of the decoded video data stream with the one frame of the decoded audio data stream and outputting a synchronized frame of audio/video data every video frame period, wherein the output synchronized frame of audio/video data includes only one frame of audio data per video frame period.

19. The non-transitory computer-readable media of claim 18, further comprising a remote station apparatus or a base station apparatus integrated with the non-transitory computer-readable media.

20. A non-transitory computer-readable media, comprising instructions stored thereon that, if executed by a processor, cause the processor to control execution of a method for decoding and synchronizing audio and video data, the method comprising:
receiving a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data stream;
and outputting decoded video data in response to the encoded video data stream;
receiving encoded audio data via the wireless communication network and outputting decoded audio data;
accumulating the decoded video data for a video frame period and outputting one frame of the decoded video data each video frame period;
accumulating the decoded audio data for an audio frame period and outputting one frame of the decoded audio data each audio frame period; and
combining the one frame of the decoded video data with the one frame of the decoded audio data and outputting a synchronized frame of decoded audio/video data every video frame period, wherein the output synchronized frame of decoded audio/video data includes only one frame of audio data per video frame period.

21. The non-transitory computer-readable media of claim 20, further comprising a remote station apparatus or a base station apparatus integrated with the non-transitory computer-readable media.

22. A data stream synchronizer, comprising:
means for receiving a plurality of communication channel packets over a variable capacity communication channel via a wireless communication network, wherein the plurality of communication channel packets includes:
first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and
second blocks of communication channel packets, where each block in the second blocks of communication channel packets corresponds to a respective audio frame that is encoded into an encoded audio data stream;
means for decoding the encoded video data stream and to output a decoded video data stream;
means for decoding the encoded audio data stream and to output a decoded audio data stream;
means for accumulating the decoded video data stream and to output one frame of the decoded video data stream each video frame period;
means for accumulating the decoded audio data stream and to output one frame of the decoded audio data stream each audio frame period;

means for buffering the frames of the decoded audio and video data streams; and means for combining the one frame of the decoded video data stream with the one frame of the decoded audio data stream and to output a synchronized frame of audio/video data every video frame period, wherein the output synchronized frame of audio/video data includes only one frame of audio data per video frame period.

23. A remote station apparatus, comprising:

means for receiving a plurality of communication channel packets over a variable capacity communication channel via a wireless communication network, wherein the plurality of communication channel packets includes:
    first blocks of communication channel packets, where each block in the first blocks of communication channel packets corresponds to a respective video frame that is encoded into an encoded video data, wherein the encoded video data is encoded from video frames of varying sizes, and wherein each block in the first blocks of communication channel packets occupies a period that is the same or less than a video frame period of the encoded video data irrespective of a size of the block based on a channel capacity of the variable capacity communication channel being dynamically varied to accommodate the size of the block; and
    second blocks of communication channel packets, where each block in the second blocks of communication channel packets corresponds to a respective audio frame that is encoded into an encoded audio data;

means for outputting decoded video data in response to the encoded video data;

means for outputting decoded audio data in response to the encoded audio data;

means for accumulating the decoded video data for a video frame period and outputting one frame of the decoded video data each video frame period;

means for accumulating the decoded audio data for an audio frame period and outputting one frame of the decoded audio data each audio frame period;

means for buffering the frames of the decoded audio and video data; and means for combining the one frame of the decoded video data with the one frame of the decoded audio data and outputting a synchronized frame of audio/video data every video frame period, wherein the output synchronized frame of audio/video data includes only one frame of audio data per video frame period.

24. A base station apparatus, comprising:

means for receiving a plurality of communication channel packets over a variable capacity communication channel via a wireless communication network, wherein the plurality of communication channel packets includes:
    first blocks of communication channel packets, where each block in the first blocks of communication channel packets corresponds to a respective video frame that is encoded into an encoded video data, wherein the encoded video data is encoded from video frames of varying sizes, and wherein each block in the first blocks of communication channel packets occupies a period that is the same or less than a video frame period of the encoded video data irrespective of a size of the block based on a channel capacity of the variable capacity communication channel being dynamically varied to accommodate the size of the block; and
    second blocks of communication channel packets, where each block in the second blocks of communication channel packets corresponds to a respective audio frame that is encoded into an encoded audio data;

means for outputting decoded video data in response to the encoded video data;

means for outputting decoded audio data in response to the encoded audio data;

means for accumulating the decoded video data for a video frame period and outputting one frame of the decoded video data each video frame period;

means for accumulating the decoded audio data for an audio frame period and outputting one frame of the decoded audio data each audio frame period;

means for buffering the decoded audio and video data; and means for combining the one frame of the decoded video data with the one frame of the decoded audio data and outputting a synchronized frame of audio/video data every video frame period, wherein the output synchronized frame of audio/video data includes only one frame of audio data per video frame period.

25. A method for decoding and synchronizing data streams, comprising:

receiving a plurality of communication channel packets over a variable capacity communication channel via a wireless communication network, wherein the plurality of communication channel packets includes:
    first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and
    second blocks of communication channel packets, where each block in the second blocks of communication channel packets corresponds to a respective audio frame that is encoded into an encoded audio data stream;

decoding the encoded video data stream into a decoded video data stream;

decoding an encoded audio data stream received via the wireless communication network into a decoded audio data stream;

accumulating the decoded video data stream and outputting one frame of the decoded video data stream each video frame period;

accumulating the decoded audio data stream and outputting one frame of the decoded audio data stream each audio frame period; and combining the one frame of the decoded video data stream with the one frame of the decoded audio data stream and outputting a synchronized frame of audio/video data every video frame period, wherein the output synchronized frame of audio/video data includes only one frame of audio data per video frame period.

26. A non-transitory computer-readable media, comprising instructions stored thereon that, if executed by a processor, cause the processor to control execution of a method for decoding and synchronizing data streams, the method comprising:

receiving a plurality of communication channel packets over a variable capacity communication channel via a wireless communication network, wherein the plurality of communication channel packets includes:

first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and second blocks of communication channel packets, where each block in the second blocks of communication channel packets corresponds to a respective audio frame that is encoded into an encoded audio data stream;

decoding the encoded video data stream into a decoded video data stream;

decoding the encoded audio data stream into a decoded audio data stream;

accumulating the decoded video data stream and outputting one frame of the decoded video data stream each video frame period;

accumulating the decoded audio data stream and outputting one frame of the decoded audio data stream each audio frame period; and combining the one frame of the decoded video data stream with the one frame of the decoded audio data stream and outputting a synchronized frame of audio/video data every video frame period, wherein the output synchronized frame of audio/video data includes only one frame of audio data per video frame period.

27. A data stream synchronizer, comprising:

means for receiving a plurality of communication channel packets over a variable capacity communication channel via a wireless communication network, wherein the plurality of communication channel packets includes:

first blocks of communication channel packets, where each block in the first blocks of communication channel packets corresponds to a respective video frame that is encoded into an encoded video data stream, wherein the encoded video data stream is encoded from video frames of varying sizes, and wherein each block in the first blocks of communication channel packets occupies a period that is the same or less than a video frame period of the encoded video data stream irrespective of a size of the block based on a channel capacity of the variable capacity communication channel being dynamically varied to accommodate the size of the block; and second blocks of communication channel packets, where each block in the second blocks of communication channel packets corresponds to a respective audio frame that is encoded into an encoded audio data stream;

means for decoding the encoded video data stream into a decoded video data stream;

means for decoding the encoded audio data stream into a decoded audio data stream;

means for accumulating the decoded video data stream and outputting one frame of the decoded video data stream each video frame period;

means for accumulating the decoded audio data stream and outputting one frame of the decoded audio data stream each audio frame period;

means for buffering the one frame of the decoded video data stream and the one frame of the decoded audio data stream, wherein the buffering means are sized at least partially based on a maximum delay experienced during transmission of the encoded video and audio data streams; and means for combining the one frame of the decoded video data stream with the one frame of the decoded audio data stream and for outputting a synchronized frame of audio/video data every video frame period, wherein the output synchronized frame of audio/video data includes only one frame of audio data per video frame period.

\* \* \* \* \*